United States Patent [19]

Dapezi

[11] Patent Number: 5,014,571

[45] Date of Patent: May 14, 1991

[54] BICYCLE PEDAL WITH A RELEASABLE BINDING

[75] Inventor: Karl Dapezi, Kleinrotz, Austria

[73] Assignee: GEZE Sport International GmbH, Fed. Rep. of Germany

[21] Appl. No.: 415,605

[22] Filed: Oct. 2, 1989

[30] Foreign Application Priority Data

Oct. 5, 1988 [DE] Fed. Rep. of Germany ....... 3833790

[51] Int. Cl.⁵ ............................................... G05G 1/14
[52] U.S. Cl. .................................................. 74/594.6
[58] Field of Search ................ 74/594.1, 594.4, 594.6, 74/560; 36/131

[56] References Cited

U.S. PATENT DOCUMENTS

4,665,767 5/1987 Lassche ............................. 74/594.6
4,762,019 8/1988 Beyl .................................. 74/594.4

Primary Examiner—Rodney M. Lindsey
Attorney, Agent, or Firm—Evenson, Wands, Edwards, Lenahan & McKeown

[57] ABSTRACT

A bicycle pedal with a releasable binding is disclosed. The shoe, by means of a sole part or connecting part, is pushed into a shoeholder on the pedal and is locked together with the shoeholder. The shoeholder is stepped down from a step-in position into a locked position, in which the shoeholder rests on the tread surface or tread plate. By the swivelling of the shoe around a pin which is approximately vertical with respect to the tread surface or tread plate, the shoe can be released against the force of a release spring. During the mentioned swivelling of the shoeholder, a locking part, which locks the sole part or connecting part in the shoeholder, emerges from the counterlocking part on the shoe. The sole part can be inserted in the holder independent of the resistance of the release spring.

22 Claims, 6 Drawing Sheets

BICYCLE PEDAL WITH A RELEASABLE BINDING

BACKGROUND AND SUMMARY OF THE INVENTION

The invention relates to a bicycle pedal with a releasable binding which makes it possible to connect a shoe fitted to this binding, or a connecting part or the like disposed on the shoe to this pedal, and when the shoe is rotated around an axis which is approximately vertical (perpendicular) with respect to the tread area of the pedal, to release this shoe or connecting part or the like disposed on the shoe against a releasing force or a spring arrangement.

Racing cyclists require a firm holding system for the shoes at the bicycle pedals. It is therefore customary to fix the shoes to the pedals. However, this results in a high risk of injury if, during a sudden stop or fall, the cyclist cannot remove his feet from the pedals fast enough.

For this reason, bicycle pedals have been developed with releasable bindings of the initially mentioned type. In this case, locking catches, which are arranged on the pedal and are acted upon by a spring, as a rule, interact with counterlocking parts arranged at the sole of the shoe in such a manner that the shoe and the pedal are locked together with one another when the shoe is placed on the tread surface of the pedal with sufficient force. By means of a rotating movement of the shoe relative to an axis which is vertical with respect to the tread surface, the locking catches can then be deflected until they reach a release position.

In these known constructions, it is a basic disadvantage, however, that the strength of the releasing resistance or of the releasing spring arrangement also increases the force which is required to press the shoe down on the tread surface of the pedal for a locking with the pedal or which is required for engaging the shoe with the locking catches.

It is therefore an object of the invention to provide a bicycle pedal with a releasable binding in which the step-in resistance is largely independent of the respective releasing force.

In the case of a bicycle pedal of the initially mentioned type, this object is achieved according to certain preferred embodiments of the invention in that a shoeholder, which formfittingly receives the connecting part or a shoe part or sole part, which, at the pedal, can be deflected around an axis which is approximately vertical with respect to the tread surface, against a releasing force or releasing spring arrangement, and relative to the tread surface, is vertically movable or can be swivelled around an axis, which is approximately in parallel to the tread surface, from a step-in position which is lifted with respect to the tread surface and in which the connecting part or the shoe part or sole part, in a direction which is approximately parallel to the sole, particularly in longitudinal direction of the shoe, can be pushed into the shoeholder or pulled out of it, when the connecting part or the shoe part or sole part is pushed in, can be stepped down against the tread surface into a locked position, in which a locking part on the pedal engages in a counterlocking part at the connecting part or shoe part or sole part, and in that a locking element securing the locked position of the shoeholder releases the shoeholder and/or the locking part emerges from the counterlocking part when the shoeholder is deflected from its locked position against the releasing force or releasing spring arrangement while swivelling around an axis which is approximately vertical with respect to the tread surface.

Therefore, according to the invention, the elements for locking the shoe and the pedal together with one another are arranged or constructed separately from those elements which permit a release of the connection between the shoe and the pedal.

By means of the arrangement of the shoeholder which is vertically movable or upward-foldable relative to the tread surface, it can be ensured in the step-in position of the shoeholder that the connecting part or the shoe part or sole part can be pushed into the shoeholder without any interference caused by the locking part on the pedal. During the subsequent pressing-down of the shoeholder, the locking part on the pedal as well as the counterlocking part on the shoe can engage in one another without any resistance, so that the shoe is held fixed at the shoeholder.

The separation of the shoe and the pedal takes place in that the shoe, for example, during a fall or intentionally is deflected by means of external forces with respect to the axis which is approximately vertical to the tread surface, with the result that the shoeholder now, because the locking element becomes ineffective as a result of the deflection, can be lifted or folded up relative to the tread surface, whereby the engagement of the locking part and the counterlocking part is discontinued, and/or that the locking part and the counterlocking part are already separated from one another as a result of the deflection of the shoeholder around the axis which is approximately vertical with respect to the tread surface.

Basically, the locking part or the locking parts may therefore be arranged stationarily at the pedal, if the engagement between the pedal and the assigned counterlocking part or counterlocking parts can be discontinued by means of the release swivel of the shoe or the shoeholder and/or by means of the lifting movement of the shoeholder which is possible when the release swivel is sufficient.

According to a preferred embodiment of the invention, it may, however, be provided that the locking part or the locking parts, during the deflecting movement of the shoeholder resulting in a release, carry out an unlocking lift relative to the pedal and correspondingly, by means of their own movement, emerge from the respectively assigned counterlocking part or counterlocking parts.

For example, the locking part, together with the shoeholder, may be deflectable around an axis which is vertical to the tread surface, and, by means of a spring, may be tensioned against a guide surface or guide path which is followed by an indentation or recess, into which the locking part sinks when the shoeholder is deflected against the release force or the release spring arrangement.

This arrangement is particularly advantageous when the shoeholder is arranged so that it can be folded upward around the axis which is approximately in parallel to the tread surface. In this case, the spring, which seeks to force the locking part against the guide surface or guide path, may simultaneously be used for acting upon the shoeholder in the direction of its folded-up position.

Other objects, advantages and novel features of the present invention will become apparent from the following detailed description of the invention when considered in conjunction with the accompanying drawings.

DETAILED DESCRIPTION OF THE DRAWINGS

The pedal shown in FIGS. 1 to 5 has a basic body 1 which is arranged at a tread crank of a bicycle, which is not shown, to be rotatable around a pedal axis 2. The top side of the basic body 1 is formed by a plane tread plate or tread surface 3 which, on its side facing away from the tread crank, has a lateral recess 4, whose purpose will be explained farther below.

At the front end of the tread surface 3, a holding part 5 is arranged on the tread surface 3 and, by means of a pin 6, can be rotated around an axis which is vertical with respect to the tread surface 3. The rotation takes place against the resistance of an adjustably prestressed release spring 7 which seeks to force the holding part 5 in FIG. 1 counterclockwise into the shown normal position.

A shoeholder 9 is disposed at the holding part 5 which can be swivelled around a shaft 8 which is parallel to the tread surface 3, this shoeholder 9 having two side parts 9' which have an approximately C-shaped profile with concave sides facing one another. Close to the shaft 8, the side parts 9' are connected by a transverse web 9" which has an angle profile in the longitudinal sectional view of FIGS. 2 and 3. At their ends away from the shaft 8, the side parts 9', on the underside, are connected with one another by means of a plate-shaped transverse web 9''', at which a spring-loaded catch 10 is arranged which interacts with the rear edge 3' of the tread surface. In the top view of FIG. 1, the side parts 9' form a funnel which opens in backward direction.

Figure 2:
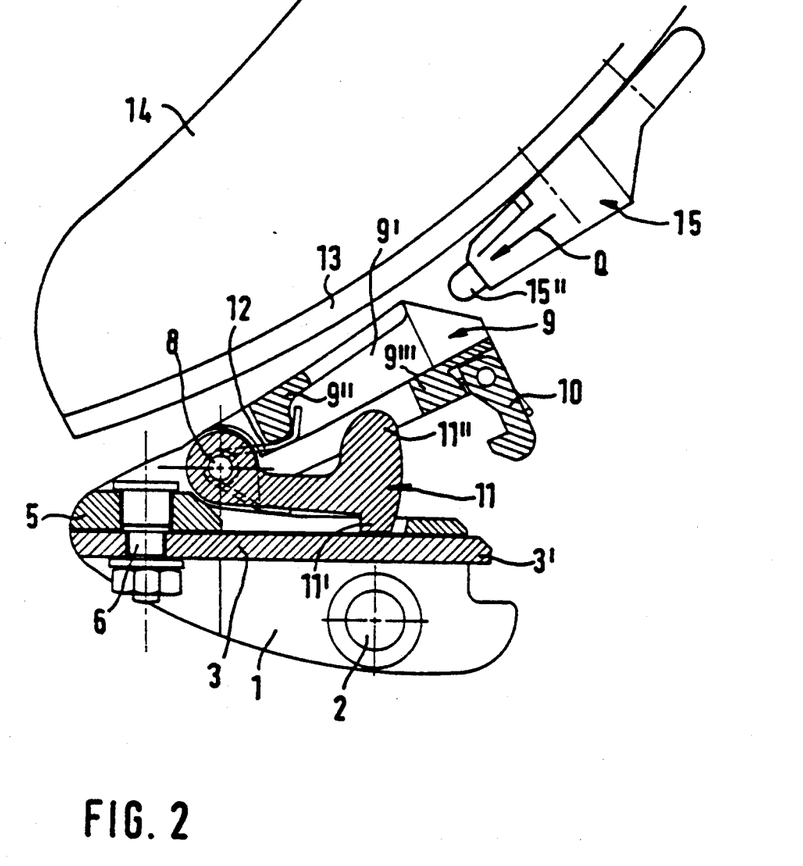
FIG. 2 is a sectional lateral view of the pedal corresponding to the section line II—II in FIG. 1, in which the step-in position of the shoeholder is shown.
Figure 3:
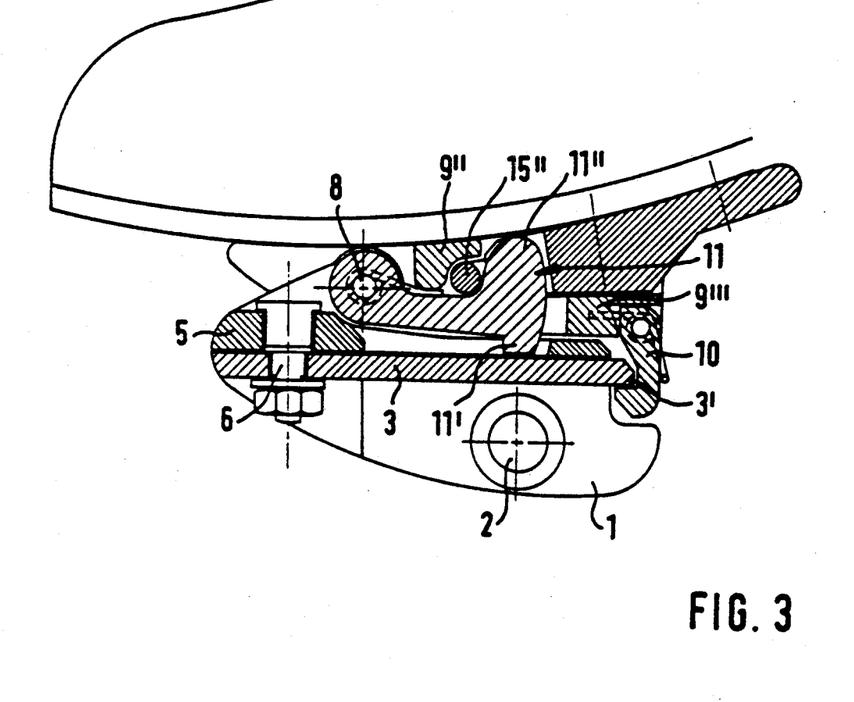
FIG. 3 is a sectional representation corresponding to FIG. 2 of the locking position of the shoeholder and the shoe.
Figure 4:
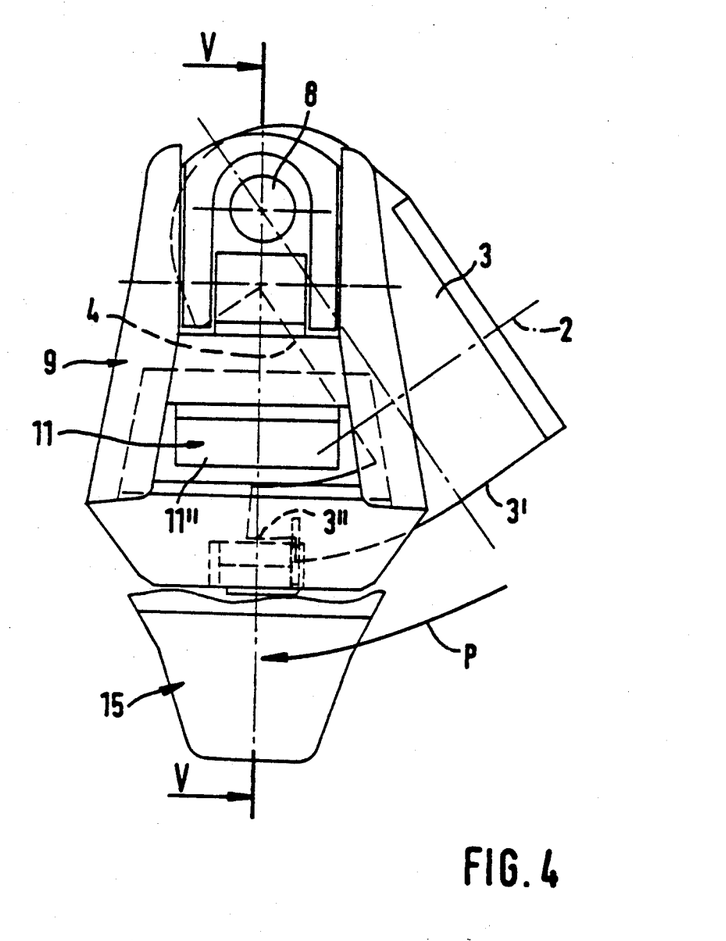
FIG. 4 is a top view of the pedal, in which its shoeholder is deflected toward the side against the force of a release spring arrangement.

Between the side parts 9', a locking part 11 which is hook-shaped in lateral view of FIGS. 2 and 3 is disposed by means of a shaft 8 holding the shoeholder 9. The locking part 11 is acted upon by a spring 12 which seeks to force the free end of the locking part 11 clockwise against the tread surface 3 (as shown in FIG. 2). The spring 12 is constructed as a leg spring arranged on the shaft 8, one leg of this leg spring being supported at the locking part 11 and the other leg of this leg spring being supported at the transverse web 9" of the shoeholder 9. Correspondingly, the spring 12 seeks to tilt the shoeholder 9 upwards while swivelling it around the shaft 8. In addition, another spring 12' may operate between the holding part 5 and the shoeholder 9 and may also be arranged as a leg spring and be arranged on the shaft 8. This other spring 12' seeks to force the shoeholder 9 into the folded-up position according to FIG. 2 relative to the holding part 5.

Figure 5:
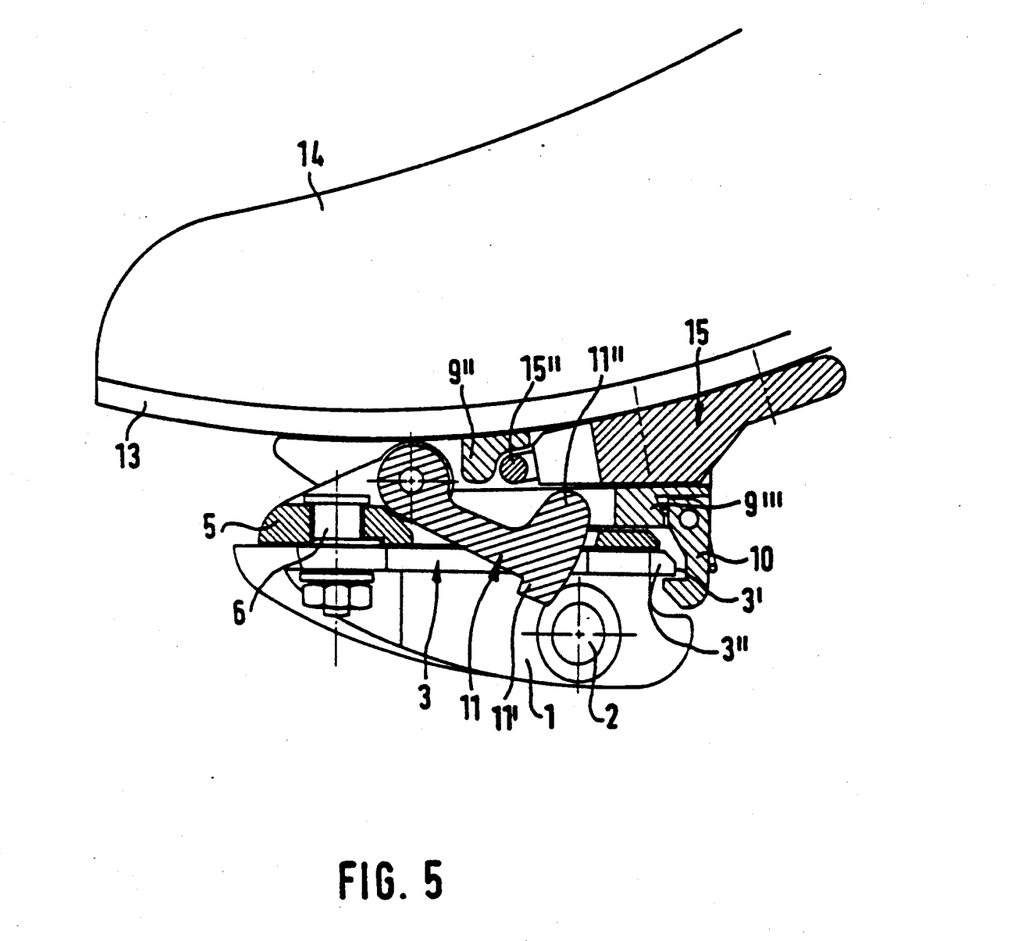
FIG. 5 is a sectional view corresponding to the section line V—V in FIG. 4.

The locking part 11, by means of a downwardly directed extension 11' arranged on it, is supported on the tread plate 3. If the shoeholder 9, together with the holding part 5, is swivelled around the axis of the pin 6 relative to the tread plate 3 corresponding to arrow P in FIG. 4, the locking part 11 takes up a position in the area of the recess 4 of the tread plate 3 and, by means of its own weight as well as the force of the spring 12, is swivelled downward, as shown in FIG. 5.

Under the sole 13 of the shoes 14, one connecting part 15 respectively is arranged which has an area 15' which is plate-shaped in top view and has an eye part 15" which is connected to it toward the front. The lateral legs of the eye part 15" which change or merge into the plate-shaped area 15' have a shape which is adapted to the profile of the lateral parts 9' of the shoeholder 9, so that the connecting part 15 or its eye part 15" is enclosed in the shoeholder 9 practically without any play, when the connecting part 15 is pushed into the shoeholder 9 as far as possible, and the eye part 15" rests against the transverse web 9" of the shoeholder 9.

Figure 1:
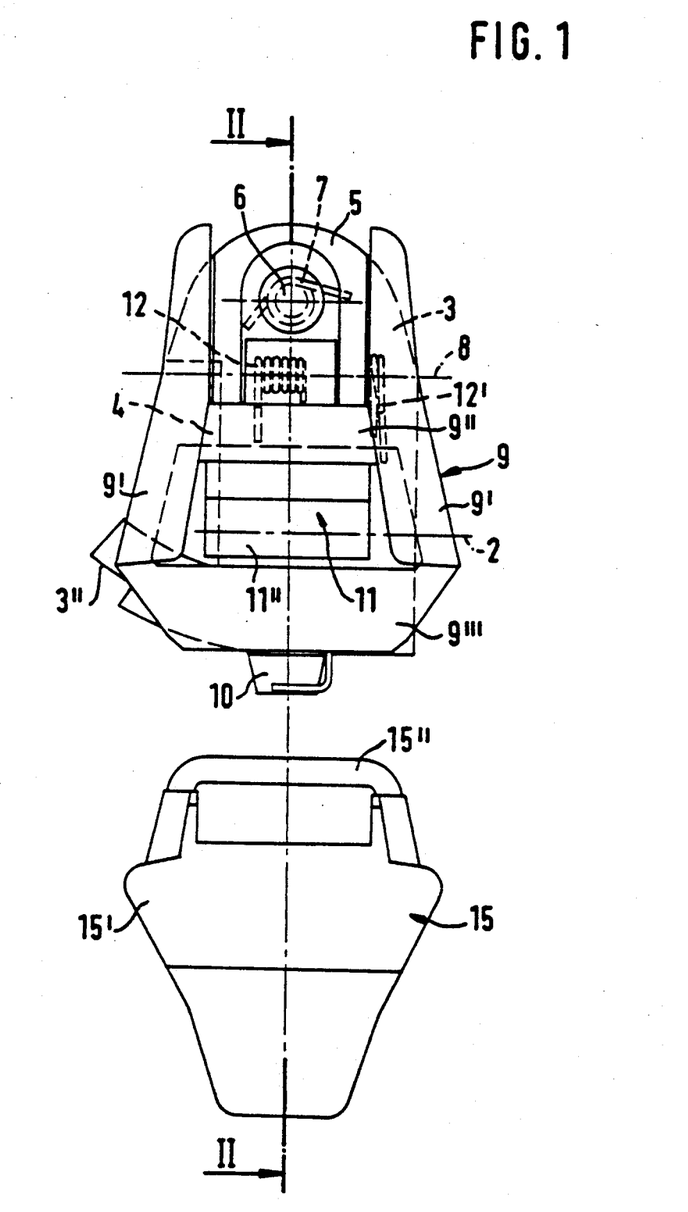
FIG. 1 is a top view of a pedal according to the invention as well as of a connecting part on a shoe which can connected with it.

The bicycle pedal shown in FIGS. 1 to 5 operates as follows:

First, the shoeholder 9 is in its step-in position corresponding to FIG. 2, in which the shoeholder 9 takes up the position which is shown in top view in FIG. 1. By means of a corresponding movement of the shoe 14, the connecting part 15 is now pushed into the shoeholder 9 corresponding to the arrow Q in FIG. 2 until the eye part 15" rests against the front transverse web 9" of the shoeholder 9, in which case, at the same time, the side parts of the eye 15", which merge into the plate-shaped area 15', come to rest without any play at the side parts 9' of the shoeholder 9. The shoe is now pressed down into the position shown in FIG. 3, the hook-shaped end 11" of the locking part 11 entering the opening of the eye part 15"; at the same time, the shoeholder 9 is locked at the rear edge 3' of the tread plate 3 by means of the catch 10. Thus, the shoe 14 firmly and without play is connected with the pedal. When the shoe 14 with its heel is now intentionally or under the influence of external forces deflected corresponding to the arrow P in FIG. 4 in the direction of the exterior side of the foot, the catch 10 of the shoeholder 9 reaches the area of a recess 3" at the rear edge 3' of the tread plate 3. At the same time, the locking part 11 falls into the lateral recess 4 of the tread plate 3. Correspondingly, the locking part 11 swivels downward according to FIG. 5; i.e., the hook-shaped end 11' of the locking part 11 no longer engages into the eye part 15" of the connecting part 15. Therefore, the shoe 14 can now be pulled to the rear in FIG. 5, in which case the connecting Part 15 is pulled out of the shoeholder 9. In addition, the shoeholder 9, because of the catch 10 located in the area of the recess 3", can now swivel upward around the shaft 8 into the step-in position.

Figure 6:
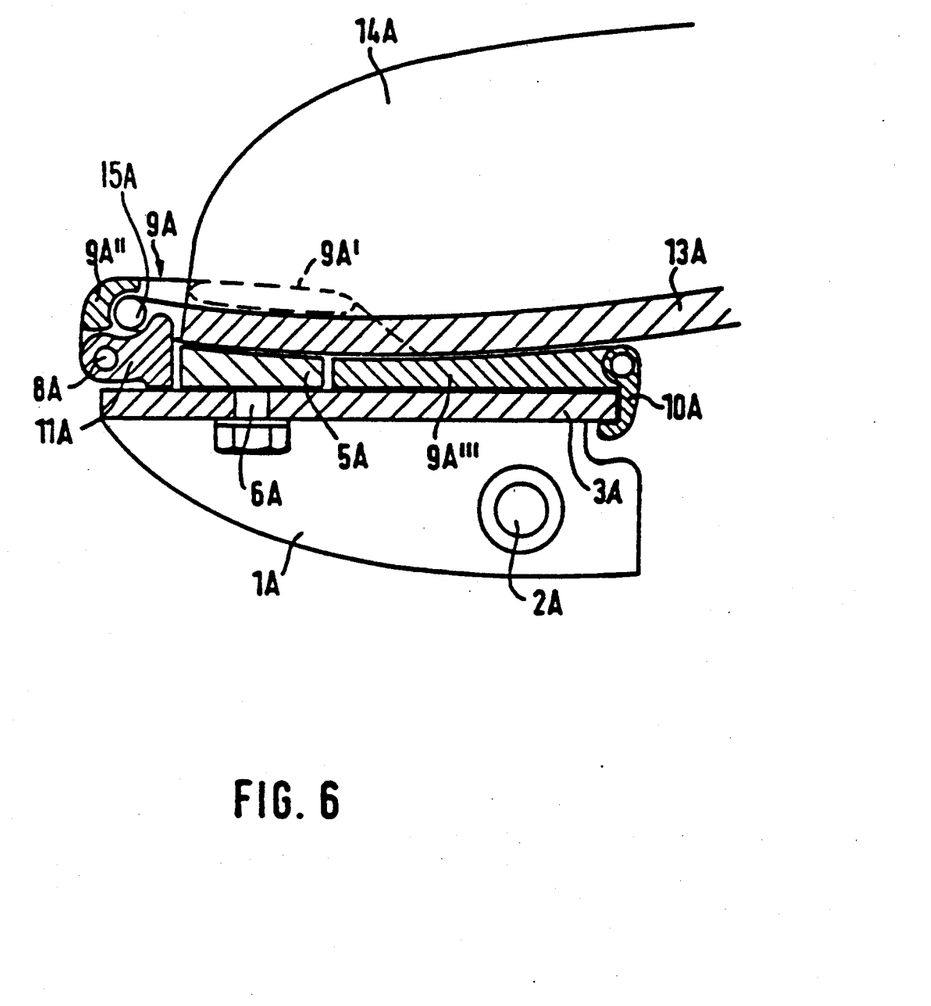
FIG. 6 is a sectional representation corresponding to FIG. 3 of a modified embodiment.

In the embodiment of FIG. 6, corresponding reference numerals as in FIGS. 1-5, with a suffix "A", are used to designate generally similar correspondingly numbered features of FIGS. 1-5. The embodiment shown in FIG. 6 differs from the embodiment according to FIGS. 1 to 5 in that the connecting part is integrated into the sole 13A of the shoe 14A in such a manner that the eye part 15A" forms the tip of the sole 13A.

As a result of this arrangement of the connecting part 15A, the bicyclist can walk in the shoes 14A almost normally.

The shoeholder 9A is shaped in such a manner that its side parts 9A' formlockingly reach around the edges of the front area of the shoe sole 13A, when the shoe sole 13A is pushed into the shoeholder 9A so far that the eye part 15A" rests against the front transverse web 9A" of the shoeholder 3A.

The shoeholder 9A as well as the locking part 11A, in driving direction, are disposed in front of the pin 6A of the holding part 5A so that they there they can be swivelled around the shaft 8A.

The operation of the pedal shown in FIG. 6 corresponds to the operation of the pedal shown in FIGS. 1 to 5. The shoeholder 9A has a step-in position which is folded up corresponding to FIG. 2, in which the front area of the shoe sole 13A with the eye part 15A" can be pushed into the shoeholder 9A without any interference caused by the hook-shaped end 11A' of the locking part 11A. When the shoeholder 9A is stepped down, the hook-shaped end 11A" of the locking part 11A will then engage in the eye part 15A. At the same time, the catch 10A, which is acted upon by the spring, at the rear edge of the rear cross-web 9A''' of the shoeholder 9A, reaches around the edge 3A' of the tread surface or tread plate 3A which points toward the rear. When the shoe 13A with the heel is now swivelled toward the exterior side of the foot against the force of the release spring 7A, the catch 10A is released from the edge 3A'. At the same time, the locking part 11A falls into a recess of the tread surface or tread plate 3A which is not visible in FIG. 6, so that the hook-shaped end 11A" emerges from the eye part 15A".

Other modified advantageous embodiments are also contemplated. For example, the locking part 11, 11A may also interact with recesses, projections or the like at the sole edge and/or a lateral part of the shoe 14, 14A. In addition, embodiments are contemplated wherein locking part 11, 11A is arranged stationarily at the tread surface or tread plate 3, 3A. In this case, it must be ensured that the shoe 14, 14A, its sole 13, 13A or its connecting part 15, 15A can be pushed into the shoeholder 9, 9A without any interference from the locking part 11, 11A, when the shoeholder 9, 9A takes up its step-in position. When the shoeholder 9, 9A is stepped down, the stationary locking part 11, 11A is engaged with the counterlocking part on the shoe. In addition, the stationary locking part must have such a distance from the pin 6, 6A or the axis around which the shoeholder 9, 9A is deflected during the release, that by means of the mentioned swivelling movement, the locking engagement between the stationary locking part 11, 11A and the counterlocking part on the shoe is released.

In FIGS. 1 to 6, the shoeholder 9, 9A, in each case, carries out a swivel movement around the shaft 8, 8A, when it is stepped down from its step-in position into the locked position. Instead of such a pivotable arrangement, constructions are also contemplated in which the shoeholder 9, 9A carries out a purely translatory lifting movement relative to the tread surface or tread plate.

The catches 10, 10A in FIGS. 1 to 6 are each arranged at the shoeholder 9, 9A and interact with the rear edge 3', 3A' of the tread surface or tread plate 3, 3A. Instead, it is also contemplated to arrange the catches 10, 10A at the tread plate 3, 3A and, in the locked position of the shoeholder 9, 9A, to let the catch 10, 10A reach behind an edge at the rear edge of the rear transverse web 9''', 9A'''.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A bicycle pedal arrangement with a releasable binding which makes it possible to connect one of a shoe or a connecting part disposed on a shoe to a bicycle pedal, and when the shoe is rotated around an axis which is approximately vertical with respect to a tread surface or tread plate of the pedal to release this shoe or connecting part disposed on the shoe against a releasing force or a releasing spring arrangement, wherein said binding comprising a shoeholder, which formfittingly receives the shoe or connecting part, and which, at the pedal, can be deflected around a pin, which is approximately vertical with respect to the tread surface or tread plate, against the releasing force or releasing spring arrangement, and relative to the tread surface or tread plate, is vertically movable or can be swivelled around a shaft, which is approximately in parallel to the tread, from a step-in position which is lifted with respect to the tread surface or tread plate and in which the connecting part or the shoe part, can be pushed into the shoeholder or pulled out of it in a direction which is approximately parallel to the sole of the shoe, particularly in longitudinal direction of the shoe, when the connecting part or the shoe is pushed in, said shoeholder can be stepped down against the tread surface or tread plate into a locked position, in which a locking part on the pedal engages in a counterlocking part at the connecting part or shoe, and wherein a locking element securing the locked position of the shoeholder releases the shoeholder, and the locking part emerges from the counterlocking part when the shoeholder is deflected from its locked position against the releasing force or releasing spring arrangement while swivelling around the pin which is approximately vertical with respect to the tread surface or tread plate.

2. A bicycle pedal according to claim 1, wherein the shoeholder is tensioned by means of the spring arrangement in the direction of the step-in position.

3. A bicycle pedal according to claim 1, wherein the locking part, together with the shoeholder, can be deflected around the pin which is vertical with respect to the tread surface or tread plate, and when the shoeholder is deflected against the releasing force or releasing spring arrangement, swivels downward relative to the tread surface or tread plate and thus emerges from the counterlocking part.

4. A bicycle pedal according to claim 3, wherein the locking part is tensioned by means of a spring against a guide surface or guide path, to which an indentation or recess is connected into which the locking part sinks when the shoeholder is deflected against the releasing force or the releasing spring arrangement.

5. A bicycle pedal according to claim 3, wherein a single spring, such as a leg spring, forces the shoeholder into the step-in position and forces the locking part in a downward direction.

6. A bicycle pedal according to claim 1, wherein the locking part in the locked position engages in an eye at the connecting part.

7. A bicycle pedal according to claim 1, wherein the locking part in the locked position interacts with one of a projection or a recess in the sole or at the sole edge or in or at a shoe part.

8. A bicycle pedal according to claim 1, wherein the locking element is acted upon by a spring and automatically lock into the counterlocking part when the shoeholder is stepped downward relative to the tread surface or tread plate, and wherein the locking engagement can be released by the deflection of the shoeholder against the releasing force or releasing spring arrangement.

9. A bicycle pedal according to claim 8, wherein the locking element is constructed as a spring-loaded catch.

10. A bicycle pedal according to claim 1, wherein the releasing force or the releasing spring arrangement for the shoeholder accommodates movement of the shoeholder, into a position wherein the shoeholder can be stepped down into the locked position.

11. A bicycle pedal according to claim 1, wherein the locking part which, by the stepping-down of the shoeholder, engage with the counterlocking part, are stationarily arranged at the pedal at a distance from the pin which is vertical with respect to the tread surface or tread plate, in such a manner that, when the shoeholder is swivelled around the pin which is vertical with respect to the tread surface or tread plate, they emerge from the counterlocking part.

12. A bicycle pedal according to claim 1, wherein an eye on the shoe is arranged as the counterlocking part, into which the locking part enters from below when the shoeholder is stepped down.

13. A bicycle pedal according to claim 1, wherein the locking element can be released.

14. A bicycle pedal according to claim 1, wherein a release resistance of the shoeholder generated by the spring arrangement can be adjusted or changed.

15. A releasable binding arrangement for releasably securing a cycler's shoe at a bicycle pedal comprising:
   holding part means mountable at a bicycle tread surface means for predetermined guided movement with respect to the tread surface means between a cycling position and release position,
   shoeholder means mountable at the holding part means for predetermined guided movement with respect to the holding part means between a cycling position and a release position,
   shoe locking part means fixedly attachable to a cycler's shoe and selectively engageable into and out of the shoeholder means,
   shoeholder latching means for releasably latching the shoeholder means in said cycling position at the holding part means,
   shoe locking part latching means for releasably latching the shoe locking part means in the cycling position fully inserted in the shoeholder means,
   and binding release means for accommodating automatic release of said shoeholder latching means and said shoe locking part latching means, in response to predetermined forces exerted between the shoeholder means and the bicycle tread surface means,
   wherein said shoe locking part means, shoeholder means, and binding release means are configured to accommodate engagement of the shoe locking part means and the shoeholding means independently of any resistance exerted by the binding release means, whereby the cycler can easily insert the shoe locking part means into the shoeholder means during mounting of the cycler on a bicycle utilizing the releasable binding arrangement.

16. A releasable binding arrangement for releasably securing a cycler's shoe at a bicycle pedal according to claim 15, wherein the holding part means is rotatably mounted for movement about a holding part support axis extending substantially perpendicular to the tread surface means.

17. A releasable binding arrangement for releasably securing a cycler's shoe at a bicycle pedal according to claim 16, wherein the binding release means includes resilient means interposed between the holding part means and tread surface means which continuously resists movement of the holder part means away from the cycling position on the tread surface means.

18. A releasable binding arrangement for releasably securing a cycler's shoe at a bicycle pedal according to claim 17, wherein the shoeholder means is pivotably mounted at the holding part means for movement about a shoeholder means support axis extending transverse to the holding part support axis between said shoeholder cycling position where the shoeholder means extends substantially horizontally along the tread surface means and said shoeholder release position with a rear part of the shoeholder means pivoted upwardly away from the tread surface means.

19. A releasable binding arrangement for releasably securing a cycler's shoe at a bicycle pedal according to claim 18, wherein said shoeholder release position is a shoe insertion position where said shoe locking part means can be inserted in the shoeholder means without any resistance by the resilient means interposed between the holder part means and tread surface means.

20. A releasable binding arrangement for releasably securing a cycler's shoe at a bicycle pedal according to claim 19, wherein said binding release means includes resilient means continously biasing the shoeholder means toward the shoeholder release position, said shoeholder means being pivotal downwardly toward said cycling position by the weight of the cycler with said shoeholder latching means being operable to automatically latch the shoeholder means in said cycling position whenever the shoeholder means is moved downward and the holder part means is disposed rotatably in the cycling position with respect to the tread surface means.

21. A releasable binding arrangement for releasably securing a cycler's shoe at a bicycle pedal according to claim 20, wherein said shoe locking part latching means includes a shoe locking part latching lever which is mounted at the holding part means for pivotal movement between a shoe locking part means latching position engaging the shoe locking part means and a release position releasing the shoe locking part means.

22. A releasable binding arrangement for releasably securing a cycler's shoe at a bicycle pedal according to claim 21, wherein said holding part means is configured to prevent movement of the shoe locking part latching lever away from its latching position when the holding part means is in an in-use cycling rotative position on the tread surface means and to permit movement of the shoe locking part latching lever when the holding part means is forced to a rotative release position by excessive forces acting between the shoeholding means and the tread surface means.

* * * * *